US012664132B2

(12) United States Patent (10) Patent No.: US 12,664,132 B2

Reeves et al. (45) Date of Patent: *Jun. 23, 2026

(54) ARTIFICIAL INTELLIGENCE BASED RULE GENERATION FOR DATABASE CHANGE DEPLOYMENT

(71) Applicant: LIQUIBASE INC., Austin, TX (US)

(72) Inventors: Robert E. Reeves, Austin, TX (US); Peter James Pickerill, Austin, TX (US)

(73) Assignee: LIQUIBASE INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,240

(22) Filed: May 6, 2024

(65) Prior Publication Data

US 2024/0289307 A1 Aug. 29, 2024

Related U.S. Application Data

(63) Continuation of application No. 17/161,334, filed on Jan. 28, 2021, now Pat. No. 12,013,824.

(60) Provisional application No. 62/966,900, filed on Jan. 28, 2020.

(51) Int. Cl.
| | |
|---|---|
| *G06F 16/21* | (2019.01) |
| *G06F 11/34* | (2006.01) |
| *G06F 16/23* | (2019.01) |
| *G06F 16/2453* | (2019.01) |
| *G06N 5/025* | (2023.01) |
| *G06N 20/00* | (2019.01) |

(52) U.S. Cl.
CPC ........ *G06F 16/213* (2019.01); *G06F 11/3428* (2013.01); *G06F 16/2358* (2019.01); *G06F 16/24542* (2019.01); *G06N 5/025* (2013.01); *G06N 20/00* (2019.01)

(58) Field of Classification Search
CPC ............. G06F 16/213; G06F 16/24542; G06F 16/2358; G06F 11/3428; G06N 20/00; G06N 5/025
See application file for complete search history.

(56) References Cited

U.S. PATENT DOCUMENTS

| | | | |
|---|---|---|---|
| 10,268,709 B1* | 4/2019 | Suehs ................... | G06F 16/211 |
| 10,621,064 B2* | 4/2020 | Gongloor ............ | G06F 11/3452 |
| 2008/0183766 A1* | 7/2008 | Weston ................. | G06F 16/284 |
| 2011/0022586 A1* | 1/2011 | Wilkinson ............ | G06F 16/217 |
| | | | 707/E17.014 |
| 2018/0189055 A1* | 7/2018 | Dasgupta ............ | G06F 11/3692 |
| 2020/0125545 A1* | 4/2020 | Idicula ................. | G06F 16/217 |
| 2021/0004357 A1* | 1/2021 | Bagchi ................. | G06F 16/217 |

* cited by examiner

*Primary Examiner* — Sherief Badawi
*Assistant Examiner* — Earl Levi Elias
(74) *Attorney, Agent, or Firm* — Sprinkle IP Law Group

(57) ABSTRACT

Embodiments provide systems, methods, and computer program products that utilize artificial intelligence/machine learning to process database change data and correlated performance data to predict the impact of database changes and generate rules with respect to database changes to prevent undesired behavior or promote increased performance.

17 Claims, 8 Drawing Sheets

ARTIFICIAL INTELLIGENCE BASED RULE GENERATION FOR DATABASE CHANGE DEPLOYMENT

RELATED APPLICATIONS

This application is a continuation of and claims the benefit of priority of U.S. patent application Ser. No. 17/161,334, entitled "ARTIFICIAL INTELLIGENCE BASED RULE GENERATION FOR DATABASE CHANGE DEPLOY-MENT," filed Jan. 28, 2021, now issued as U.S. Pat. No. 12,013,824, which claims the benefit of priority under 35 U.S.C. § 119(e) of U.S. Provisional Application No. 62/966,900, entitled "ARTIFICIAL INTELLIGENCE BASED RULE GENERATION FOR DATABASE CHANGE DEPLOYMENT," filed Jan. 28, 2020, which is hereby fully incorporated by reference herein for all purposes.

TECHNICAL FIELD

This disclosure relates generally to management of computer systems. More particularly, embodiments relate to management database systems. Even more particularly, embodiments disclosed herein relate to systems, methods, and computer readable media for database change management incorporating artificial intelligence/machine learning to generate deployment rules.

BACKGROUND

Delivering new software experiences to market often involves not only deploying new application code but also updating database schema and database logic to support the application code. A variety of tools have been developed with the goal of streamlining application code delivery. Many organizations, however, still rely on a shared service database team to manually review and deploy database code changes. Given that the end-user experience is incomplete without the full software stack, which includes both the application and the database, there has been growing interest in continuous integration (CI) and delivery to bring similar integration and deployment best practices as are employed for application code changes to database changes and enable database code (e.g., SQL) code to flow through the software release pipeline, synchronized with application code. By aligning database deployments with application deployments, teams can bring new innovations to the market faster and with higher quality.

The development of databases and database schemas to support application code is increasingly complex. In many cases, database schema changes must be made in successive environments as the application code progresses from development to production. Some database change management tools support the application of rules to allow or reject changes before the changes are deployed to a target database. Such tools either apply hard coded rules or rely on users to specify rules based on personal knowledge. Thus, in a given implementation, the database change management tool may apply sub-optimal rules and allow changes that degrade system performance.

SUMMARY

Attention is thus directed to the artificial intelligence systems disclosed herein. These artificial intelligence systems may utilize database change data and correlated performance data to develop machine learning models to pre-dict database change impacts and develop rules to update database change deployment systems.

One embodiment provides a database change management system that includes a memory configured for storing a set of database changes of a plurality of database change types, a set of pre-change performance data and a set of post-change performance data. The system also includes a processor and a non-transitory, computer-readable medium storing computer-executable code. The computer-executable code comprises instructions for correlating the set of pre-change performance data and the set of post-change performance data to the set of database changes to generate a set of correlated performance data for the set of database changes, generating database change numeric representations from the set of database changes and the set of correlated performance data, each database change numeric representation comprising a representation of a database change type and a piece of correlated performance data, processing the database change numeric representations using a machine learning model to identify a change pattern having a strong correlation to a database change impact corresponding to the piece of correlated performance data, the change pattern including a first database change type from the plurality of database change types, based on the change pattern, automatically generating a rule that applies to the first database change type and updating a database change deployment system with the rule. According to some embodiments, the rule is executable to prevent a new change of the first database change type from being deployed. Embodiments also include related methods and computer program products.

According to one aspect of the present disclosure, the set of correlated performance data comprises computer server performance data, database server performance data, a set of database change results, or other data.

According to another aspect of the present disclosure, the set of database changes includes a plurality of change field values and wherein the database change numeric representations represent the plurality of change field values and wherein the change pattern represents a first change field value from the plurality of change field values.

According to another aspect of the present disclosure, each database change numeric representation comprises a matrix having positions representing each of the plurality of database change types.

Another embodiment includes a system comprising a memory for storing a database change impact machine learning model representing database changes of multiple types and corresponding correlated performance data, a processor, and a non-transitory, computer-readable medium storing computer-executable code. The computer-executable code comprises instructions for receiving a database change to be processed and extracting a database change type from the change data, generating a numeric representation of the database change, the numeric representation of the database change representing the change type, determining a database change impact for the database change by processing the numeric representation of the change using the database change impact machine learning model, and taking a remedial action based the database change impact determined for the database change. Embodiments also include related methods and computer program products.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
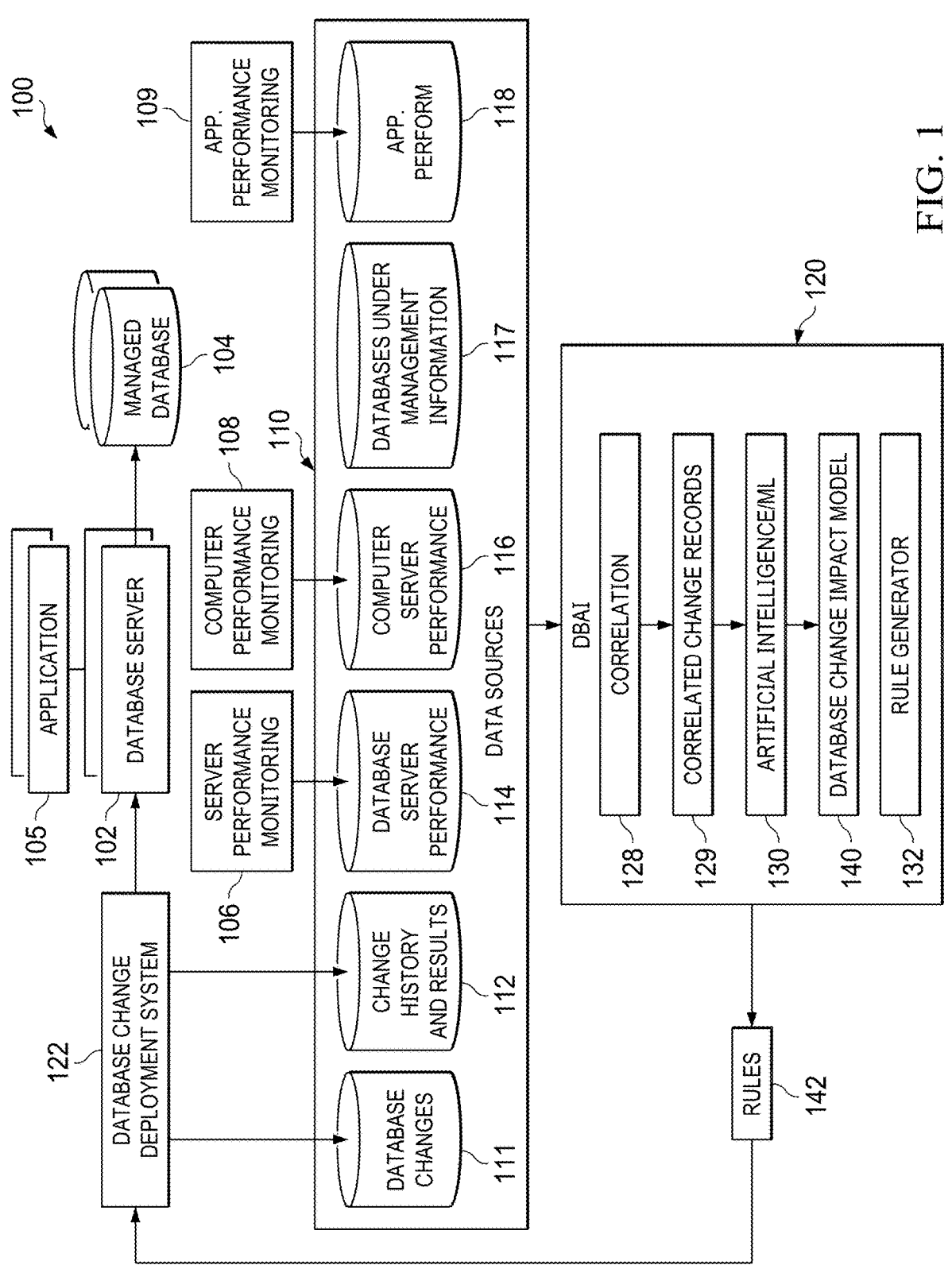
FIG. 1 is a diagrammatic representation of one embodiment of an architecture for database artificial intelligence/machine learning based rules generation for use in database change management.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. Database development and management involves running database instances in multiple environments. It is not uncommon, for example, to use three environments with potentially differing schema: a development environment; a quality assurance (QA) environment; and a production environment. The development environment is used in the authoring of the database structure. The QA environment allows for testing of the applications and enhancements that use the database. The production environment is the final database for general use.

Changes in a schema in a development environment may be migrated to the QA and production environments. At various times, the different environments may have different schemas. Moreover, multiple instances of a database in the same environment may be using different versions of a schema depending on when the database was last updated. Conventionally, database changes have been tested and deployed by manually organizing and executing the SQL scripts against the target database instance. Building a new database or modifying an existing database may be dependent on hundreds of small scripts to build out new environments or evaluate existing ones. If a script is forgotten, if a script is run in the wrong order, or if a wrong version of the script is executed, the database can suffer serious data loss or an outage.

As mentioned above, some database change management tools support the application of rules to allow or reject changes before the changes are deployed to a target database. Such tools either apply hard coded rules or rely on users to specify rules based on personal knowledge. Thus, in a given implementation, the database change management tool may apply sub-optimal rules and allow changes that degrade system performance.

What is desired, therefore, are systems that may determine and apply more optimal rules to eliminate or reduce errors and degradation in system performance.

Embodiments described herein provide database artificial intelligence/machine learning (DBAI) based rules generation for use in database change management. DBAI uses multiple sources of information to create rules to prevent undesired behavior and/or promote increased performance. In one embodiment, the sources of information include: data about specific changes themselves, the history of changes and results, and date/time stamps of changes to identify when changes were made to a database. The sources of information can also include database performance data to correlate database performance pre-change and post-change. Other sources of information may also be included.

In particular, DBAI is configured to identify negative correlations and negative results and/or impacts (rollbacks, failed deployments, decreases in database performance). In addition, or in the alternative, DBAI is configured to identify positive correlations and positive results and/or impacts (no rollback, deployment success, increase in performance). Rules can be generated to discourage negative changes and/or encourage positive changes.

DBAI can automatically create rules to augment or replace rules in a database change deployment system. In some embodiments, the rules are automatically deployed to the deployment system. In addition, or in the alternative, DBAI can recommend rules to a user, where the user is responsible for approving or changing the rules prior to the rules being used by the deployment system.

In some embodiments, DBAI generated rules are used to create recommendations—for example, to warn a user that a change in a changeset will be non-performant or to suggest adding a change that is predicted to increase performance. In another embodiment, a DBAI generated rules can be used to automatically reject proposed changes that are predicted to be non-performant. In yet another embodiment, DBAI generated rules can be used to automatically insert changes for a deployment where the changes are predicted to be beneficial. Furthermore, DBAI can be applied to previously applied changes to identify changes that are non-performant and should have been rejected or to recommend changes to rollback.

Embodiments described herein may be used to enhance database change deployment systems that include forecast capability. For example, assume a change is submitted to create a column with a data type of VARCHAR2(5000), but the VARCHAR2 is 4000 by default in a managed database. This change would fail with an error from the database if deployed but, in the absence of a previously defined forecast rule, would be missed in the forecast by the database change deployment system. By identifying such a change as non-performant and creating a rule—automatically in some embodiments—embodiments described herein can increase the efficacy of the forecast.

As another example, a database change deployment system may successfully deploy a change through a number of environments (e.g., from a dev environment to a test environment to a staging environment), but the change could be rejected in production (e.g., due to a DBA rejecting the change) leading to a rollback of the change in previous environments. Embodiments described herein can evaluate the change that was persisted to early environments, rejected, and then changed. The DBAI can identify the differences in rejected and approved changes to identify the types of changes to prevent and prefer in the future. For example, the DBAI can be configured to identify commonalities in rolled back changes to identify change types that should be recommended against or not allowed. For example, if a user continues to rollback creating tables of a CLOB data type, the system could suggest making a rule that prevents that action in the future, automatically generate a rule to recommend against the action, or automatically generate a rule to prevent the action, depending on implementation).

As another example, the DBAI can be configured to recognize patterns in changesets that regularly fail forecast and deployments and suggest making rules to prevent such patterns from recurring, automatically generate a rule that recommends against proposed changes that meet the pattern, or automatically generate a rule to block changes that meet the pattern.

FIG. 1 is a diagrammatic representation of one embodiment of an architecture 100 for database artificial intelligence/machine learning based rules generation for use in database change management. In the illustrated embodiment, architecture 100 includes a database server 102 that provides a managed database 104, an application 105 which utilizes the managed database 104, a database server performance monitoring component 106, a computer performance monitoring component 108, an application performance monitoring component 109, DBAI component 120, and a database change deployment system 122. Each of database server 102, database 104, application 105, database server performance monitoring component 106, computer performance monitoring component 108, application performance monitoring component 109, DBAI component 120, and database change deployment system 122 may reside on one or more computers (e.g., server computers) and multiple components may reside on the same computer. Furthermore, one or more of the components may be integrated. By way of example, but not limitation, a database monitoring tool may provide both database server performance monitoring component 106 and computer performance monitoring component 108. As another example, DBAI component 120 may be implemented as part of database change deployment system 122.

At a high level, DBAI component 120 includes an artificial intelligence/machine learning (AI/ML) component 130 that processes a large amount of data from a number of data sources (e.g., data sources 110) to identify patterns representing performant or non-performant changes. A rules generator 132 can take the output from AI/ML component 130 to automatically build rules 142. Rules 142 may include rules to prevent certain changes from being implemented, rules to require certain changes, rules to recommend for or against including certain changes in a changeset. Rules 142 may be enforced at database change deployment system 122, a change authoring tool or at another component. Another implementation could take the form of recommending rules.

In another embodiment, AI/ML is configured to train a database change impact model 140 that can be used to classify proposed changes. In such an embodiment, the class (or the highest confidence class) may be considered the predicted performance impact for the change or set of changes. Rules can be written to handle proposed changes based on the classes assigned to the proposed changes by database change impact model 140.

In another embodiment, AI/ML is configured to train a regression model (e.g., a linear regression model) as database change impact model 140 to output a predicted numerical value for a performance metric as predicted performance impact. For example, a model may be developed to output a predicted change in CPU utilization, a predicted resulting CPU utilization, a predicted change in memory utilization, a predicted resulting memory utilization, a predicted change in the ratio of database connections to CPU utilization, a predicted resulting ratio of database connections to CPU utilization, or a predicted value for another performance metric of interest. Rules can be written to handle proposed changes based on the predicted performance impact.

Turning to other entities in architecture 100, database change deployment system 122 provides mechanism to deploy changes to the configurable elements or relationships of a database. According to one embodiment, database change deployment system 122 is a database release automation system implementing various rules. One or more rules applied by database change deployment system 122 (e.g., SQL rules, pre-forecast rules, forecast, post forecast rules or other rules) can be generated by or utilize a model trained by DBAI component 120. The rules can be augmented or replaced by rules created by or based on the output of DBAI component 120.

Database change deployment system 122 manages the deployment of changes to managed databases, such as database 104. A set of changes that was deployed or for deployment in a deployment job can be represented by a database change log (or changelog) that specifies changes to the configurable elements or relationships of a database. A change log can include changesets. Changesets can define changes to be made to a database and include operations that are to be executed against the target database. A changeset includes one or more changes logically grouped together as a unit of change to a database. A changeset may be equivalent to one or more SQL statements, but represented in a database-neutral format. In some embodiments, changes may be represented as change objects, such as Liquibase change objects (LIQUIBASE by DATICAL of Austin, TX). Each change in a changeset may include a change type (e.g., AddColumnChange) and one or more field values for fields of the change (e.g., a value for column name). In other embodiments, a changeset can be specified in or include SQL or other query language statements. A changelog and changesets may be represented in a variety of formats including, but not limited to, XML, YAML or other formats.

Database change deployment system 122 may also include an audit database that records a detailed report of the changes deployed (e.g., by reference to a changelog and/or individual change); runtime data (e.g., deployment operation duration, person or automation agent and system from which the operation was initiated); results of any rules validation; salient messages from the database during the update or other data. In some embodiments, the audit database also records indications of human initiated actions, such as rollback or abandonment, that may indicate a non-performant change. In some implementations, database change deployment system 122 is implemented by a provider that manages database change deployments for a large number of entities/customers. As such, changes, change histories and results can be collected for a wide variety of deployment situations.

Database server performance monitoring component 106 monitors the performance of database server 102, application performance monitoring component 109 monitors the performance of application 105, computer performance monitoring component 108 monitors the underlying computer system that executes database server 102 and database 104 and application performance monitoring component 109 monitors the application 105 that utilizes database 104. A computer performance monitoring component 108 may also be provided to monitor the underlying computer system that executes application 105. In implementations in which database server 102 is running on a cloud computing platform, computer performance monitoring component 108 may be configured to collect monitoring data provided by the underlying cloud computing platform including information about the physical or virtual machines on which database server 102 is running. Similarly, a computer performance monitoring component 108 may be configured to collect monitoring data provided by the underlying cloud computing platform including information about the physical or virtual machines on which application 105 is running.

Database server performance monitoring component 106 stores time stamped database server performance data for database server 102. Application performance monitoring component 109 stores time stamped application performance data for application 105. Computer performance monitoring component 108 stores time stamped performance data for the computer system running database server 102 and/or application 105. While only a single database server performance monitoring component 106, computer performance monitoring component 108 and application performance monitoring component 109 are illustrated, there may be many such components running, monitoring a large number of database servers, applications, and underlying computer systems.

In one embodiment then, data source 111 comprises changes deployed to databases under management (e.g., changelogs containing deployed changes), data source 112 includes change histories and results from a large number of deployments, data source 114 includes time stamped records of database server performance data, data source 116 includes time stamped records of computer performance data, and data source 118 includes time stamped records of application performance data. Database change deployment system 122 or another component may maintain records of information about the databases being managed, such as the type of database server, the number of databases being managed by the database server, the size of each database or other information. Changes to such information can be time stamped and included in a data source 117 for DBAI component 120. Additional data sources may also be used. For example, in some embodiments, data from an application change deployment system can be used as data source to, for example, correlate application changes with database changes.

As will be appreciated then, data sources 110 can include a wide variety of data some non-limiting examples of which include, but are not limited to, change history and results, database server performance data, application performance data, computer performance data, and information about databases under management.

Examples of change history and results include, but are not limited to, for each change the change type (e.g., add, alter (change), or drop a column, index, table, view, stored procedure, view, trigger, or other change type), associated field values (e.g., table name, storage location, column name, data type, parameters, or other fields associated with the change), whether there was a rollback of the change, an indication of the success/failure of the change.

Examples of computer performance data include, but are not limited to CPU performance, such as CPU percent utilization, memory performance (e.g., memory utilization), input/output operations per second (IOPS) and network performance, such as throughput and input/output per second.

Database server performance data comprises information about an underlying database server. Examples of database server performance data include, but are not limited to, number of databases being managed, query throughput, input/output operations per second, query execution performance (e.g., database response time), database connections (for example, representing the number of separate systems that are connected to the database server) and buffer pool usage.

Database under management information comprises information about the databases under management. Examples of information about the databases under management includes, but are not limited to, the type of database server, the number of databases being managed by the database server, the size of each database, performance of database specific queries (e.g., time to perform the query), connections (e.g., representing the number of systems connected to a database), database buffer pool usage, input/output operations per second, table row count, size of stored data.

Examples of application performance information includes, but is not limited to, number of users, application response time, network utilization, number and size of dynamically allocated application runtime hosts.

Thus, the data sources 110 for DBAI component 120 can include a large number of time stamped records (e.g., hundreds of thousands, millions or more) that include, for example, database changes, change histories and results, database server performance data, computer performance data, database under management information, application performance information and other data for a wide variety of deployment situations. As a more particular example, the collected performance data included in data sources 110 may include, but is not limited to, time stamped records indicating computer system utilization, number of databases managed, database utilization, database response time, application utilization, application response time or other performance data. As an even more particular example, the collected performance data included in data sources 110 may include, but is not limited to, time stamped records indicating CPU utilization, memory performance, network performance, IOPS (e.g., computer system, database server, database, application), query throughput, query execution performance, connections to the database server, database server buffer pool usage, the type of database server, the number of databases being managed by the database server, the size of each database, performance of database specific queries, database connections, database buffer pool, database table row count, size of stored data, number of application users, application response time, network utilization, number and size of dynamically allocated application runtime hosts, or other information indicative of the performance of a computer system, a database server, a database, an application, or other component of interest. Similarly, for changes deployed to the database server, collected data may include the time the change was pushed to the database server, the type of change, and field values. Collected data may further include time stamped records indicating an action (e.g., human-initiated actions or system-initiated actions) indicative of the failure, rollback of the change, or abandonment of the changes. Over time the data will reflect the success, failure and rollbacks of various database changes, and the performance of the database servers and underlying computers before and after various database changes are made to the managed databases. The data may also reflect the performance of the application that utilizes the database.

Using data sources provided and correlated by a timestamp, DBAI component 120 is able to identify persisted changes that resulted in positive or negative system performance. AI/ML component 130 may implement supervised machine learning (e.g., regression, classification, pattern recognition, or other supervised machine learning), unsupervised machine learning (e.g., cluster analysis, neural networks, or other unsupervised machine learning) or combinations of supervised and unsupervised learning to identify changes that result in positive or negative impacts—for example, to identify patterns in performant and non-performant changes. DBAI component 120 may subset data for system training and allow for training against other data subsets.

In accordance with one embodiment, DBAI component 120 implements directed learning in which a user indicates which database changes to consider. In another embodiment, DBAI component 120 engages in self-directed learning in which DBAI component 120 implements rules to ignore database changes where it will be difficult to determine if a particular impact (e.g., rollback, abandonment, increase or decrease in performance) resulted from a change or from other variables. For example, if a database change is deployed to database server 102 to change database 104 and, in the same time period, another managed database is added to database server 102, then it may be difficult to determine if an increase/decrease in server performance was due to a database change or the addition of a managed database, and the change can be ignored.

According to one embodiment, DBAI component 120 includes a correlation component 128 that correlates data with changes, for example correlating, results data, database server performance data and computer performance data associated with a database server with a change deployed to a database managed by that database server (e.g., by timestamp) to determine a set of pre-change records and a set of post-change records for a database change.

Each change may be associated with deployment time that the change or a set of changes of which the change is a member was deployed (or attempted to be deployed) to database 104. Changes associated with different deployment jobs may have different associated deployment times. For example, using the deployment date/time that a selected set of changes was deployed to database 104 (for example, the date/time a selected changeset was deployed), a set of records collected between the deployment of a prior set of changes (if any) to database 104 and deployment of the selected set of changes may be considered a set of pre-change records for any changes in the selected set of changes. Similarly, a set of records collected between deployment of the selected set of changes to database 104 and deployment of the next set of changes (if any) to database 104 may be considered a set of post-change records for any changes in the selected set of changes. In other embodiments, the pre-change records for a set of changes may be records having time timestamps that fall within a window before the timestamp of when the set of changes was deployed. Similarly, in some embodiments, the post-change records for a set of changes may be records having time timestamps that fall within a window after the timestamp of when the set of changes was deployed. Pre-change and post-change records may be selected in other ways.

Thus, for a given database change, a set of pre-change performance data (for example, pre-change database server performance data, pre-change computer performance data, pre-change application performance data) and a set of post-change performance data (for example, post-change database server performance data, post-change computer performance data, post-change application performance data) can be correlated with the change. Moreover, using change histories and results, change result data can be correlated with the database change. Pre-change and post-change information about the database being managed (such as the type of database server, the number of databases being managed by the database server, the size of each database or other information) can also be correlated to a change. Correlation component 128 can also apply a variety of preprocessing on data associated with a change. For example, performance measures may be averaged, minimums and maximums determined, data binned, or other preprocessing performed.

Figure 2:
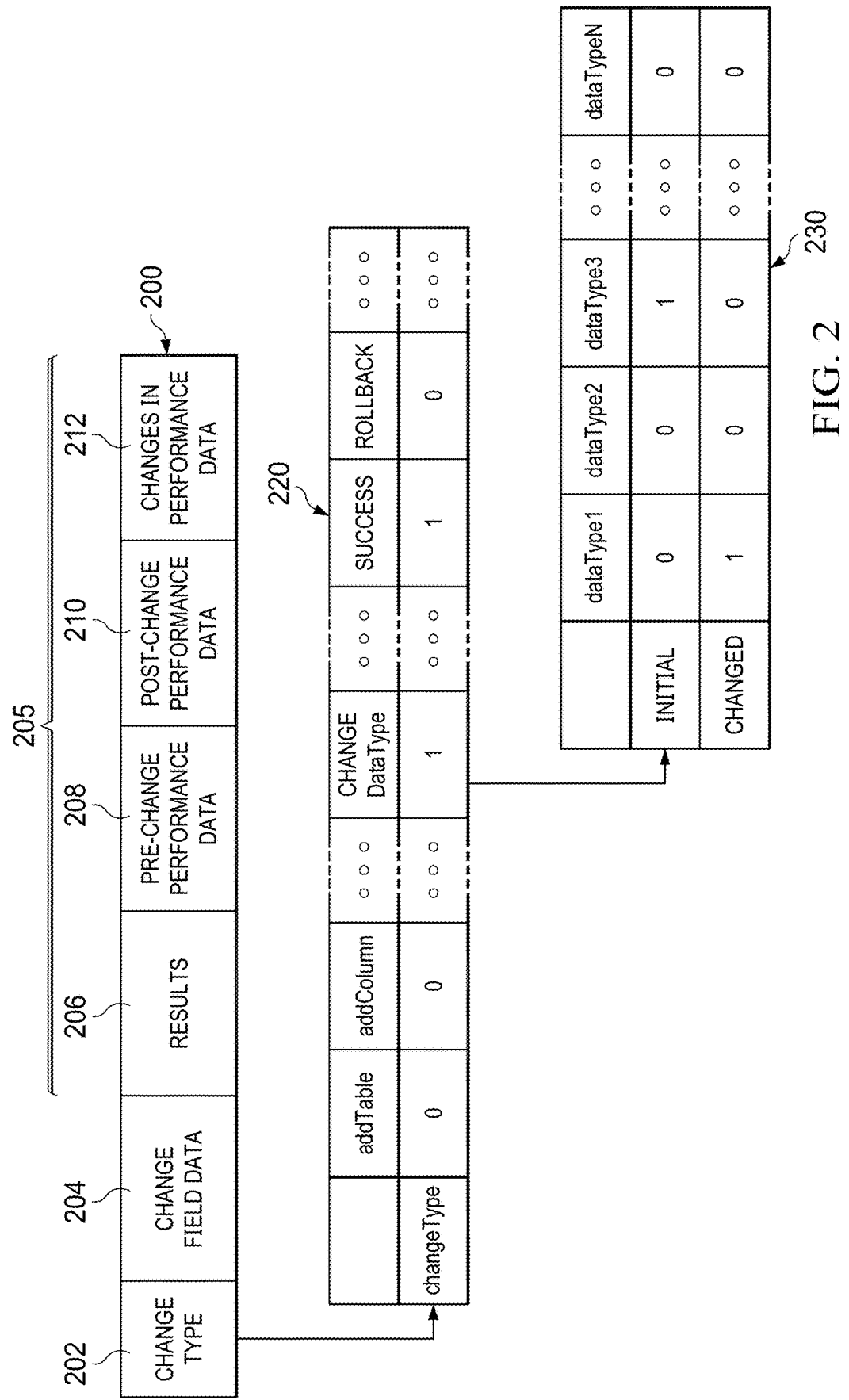
FIG. 2 is a diagrammatic representation of a change record.

Correlation component 128 can thus provide a set of correlated change data 129 to AI/ML component 130. According to one embodiment, correlated change data 129 includes a change record for each of a plurality of changes (as determined by directed or non-directed learning techniques). Turning briefly to FIG. 2, one example of a change record 200 is illustrated. In the illustrated embodiment, change record 200 includes a change type 202 (e.g., add column, add row, add column, change data type, etc.) and associated data. Examples of associated data include, for example, one or more change field values 204 (e.g., fields from the change object representing the change) and correlated performance data 205 such as database server performance metrics, computer performance metrics, and/or other data. Correlated performance data may also include results values 206 (e.g., values representing success, failure, rollback, abandonment)

The correlated performance data 205 represented in a change record 200 may include representations of pre-change performance data 208 and post-change performance data 210. The pre-change performance data 208 may include a variety of performance data including, but not limited to, CPU utilization, memory performance, network performance, IOPS (e.g., computer system, database server, database, application), query throughput, query execution performance, connections to the database server, database server buffer pool usage, the type of database server, the number of databases being managed by the database server, the size of each database, performance of database specific queries, database connections, database buffer pool usage, table row count, size of stored data, number of application users, application response time, network utilization, number and size of dynamically allocated application runtime hosts, or other information indicative of the performance of a computer system, a database server, a database, an application, or other component of interest. In some embodiments, the pre-change performance data 208 for a dimension of performance, such as CPU utilization or other dimension, is a statistical representation (e.g., mean, median, min, max, or other statistical representation) of the corresponding performance data for that dimension from the pre-change records. For example, pre-change performance data may include a pre-change CPU utilization, where the pre-change CPU utilization is the average CPU utilization from the pre-change performance records. In some embodiments, multiple dimensions of data from the pre-change records may be combined in pre-change performance data. For example, pre-change performance data 208 may include the ratio of the average CPU utilization to the average number of database connections from the pre-change performance records.

The post-change performance data 210 may include a variety of performance data including, but not limited to, CPU utilization, memory performance, network performance, IOPS (e.g., computer system, database server, database, application), query throughput, query execution performance, connections to the database server, database server buffer pool usage, the type of database server, the number of databases being managed by the database server, the size of each database, performance of database specific queries, database connections, database buffer pool usage, table row count, size of stored data, number of application users, application response time, network utilization, number and size of dynamically allocated application runtime hosts, or other information indicative of the performance of a computer system, a database server, a database, an application, or other component of interest. In some embodiments, the post-change performance data 210 for a dimension of performance, such as CPU utilization or other dimension, is a statistical representation (e.g., mean, median, min, max, or other statistical representation) of the corresponding performance data for that dimension from the post-change records. For example, post-change performance data may include a post-change CPU utilization, where the post-change CPU utilization is the average CPU utilization from the post-change performance records. In some embodiments, multiple dimensions of data from the post-change records may be combined in post-change performance data. For example, post-change performance data may include the ratio of the average CPU utilization to the average number of database connections from the post-change performance records.

In addition to pre-change performance data 208 and post-change performance data 210, or in the alternative to pre-change performance data 208 and post-change performance data 210, the correlated performance data 205 represented in change record 200 may include performance data changes 212. The performance data changes 212 may include a representation of the change in one or more dimensions of performance data (e.g., change CPU utilization from pre-change to post change, change in memory utilization from pre-change to post change). Again, the change may be based on a statistical representation of the pre-change data and the post-change data. For example, the change in CPU utilization may be the difference between the average pre-change CPU utilization determined from the pre-change records and the average post-change CPU utilization determined from the post-change records.

In one embodiment, changesets and changes are represented by objects that include a change type and the field values. The changesets and changes may be persisted as XML (e.g., in a changelog). As will be appreciated, changeset or change can be represented by a matrix that has positions for each change type supported. As will be appreciated there may be hundreds of supported change types, each with potentially multiple subtypes and configuration settings. Moreover, a sub matrix can be defined to numerically represent the fields for each change type. For example, for an addIndex change, a submatrix can represent the number of columns indexed. As another example, a submatrix for a changeDatatype change can represent the initial and changed data types. A changeset or individual change can be represented by setting the appropriate bits in the matrix and submatrices.

In the illustrated embodiment of FIG. 2, the change type 202 may be represented by matrix 220 that includes a position for each supported change type. For example, in one embodiment, matrix 220 may include a position for each change type defined in LIQUIBASE. The field values for the change type may be represented by a submatrix. For example, submatrix 230 represents initial and changed data types. Thus, in this example, the bits are set in matrix 220 and submatrix 230 to represent a changeDatatype to change a data type from dataType3 to dataType1.

In some cases, field data from a change may include relatively free form text, such as names (e.g., table names, column names, or other such text). If such fields are included in change record 200, the text may be embedded using, for example, word embedding (whole word or subword embedding), using ASCII character codes, or otherwise transforming the text into a numeric representation of the text.

Performance data may also be mapped to a matrix representation. For example, matrix 220 or another matrix may have positions to represent each value or range of values (each bin) for each dimension of pre-change performance data, post-change performance data, or performance data change that can be correlated with a change.

In some embodiments, matrix 220 may also include positions for results, such that the correlated results for a change can be represented by setting the appropriate bits in matrix 220. In some embodiments, results for a change can be represented by setting the appropriate bits in a submatrix. For example, matrix 220 may have a position to represent whether the change was a success and a submatrix to represent failure, rollback, or abandonment.

Pre-change and post-change information about the database being managed (such as the type of database server, the number of databases being managed by the database server, the size of each database or other information) may also be represented by matrix 220 (including one or more submatrices in some embodiments).

FIG. 2 is provided by way of example and not limitation. As will be appreciated, there are a variety of techniques that can be used to map change types, field values, results data, performance data and other data to a numeric representation.

Returning to FIG. 1, each change record in correlated change data 129 may thus include a matrix representation of a change. In some embodiments, a changeset containing multiple changes is represented as a single matrix (with sub-matrices) with appropriate bits set for the changes in that changeset. In another embodiment, each change is represented by its own matrix. The matrix representation may also include positions representing the correlated performance data and/or other data.

In one embodiment, AI/ML component 130 can be configured to train a database change impact model 140 to classify changes according to one or more performant and one or more non-performant classification. Database change deployment system 122 can then use the database change impact model 140 to classify proposed changes and run rules based on the classes predicted for a proposed change by database change impact model 140. For example, AI/ML component 130 can be used to train a database change impact model 140 to classify changes as causing or not causing more than a 10% increase in CPU utilization. Such database change impact model 140 may be deployed to database change deployment system 122, which can apply database change impact model 140 to proposed changes to classify the proposed changes. Based on the highest-confidence class assigned to the proposed change by database change impact model 140, database change deployment system 122 can reject, allow, recommend inclusion or exclusion of the proposed change.

As another example, it may be determined that having too many indexes on a table, or too many columns in an index can cause performance issues. A model may be trained to predict when adding indexes on a table or columns in an index will result in a performance degradation (e.g., for a given database size), such that a user can be notified of a change that is predicted to be non-performant due to adding too many indexes or to many columns.

Figure 3:
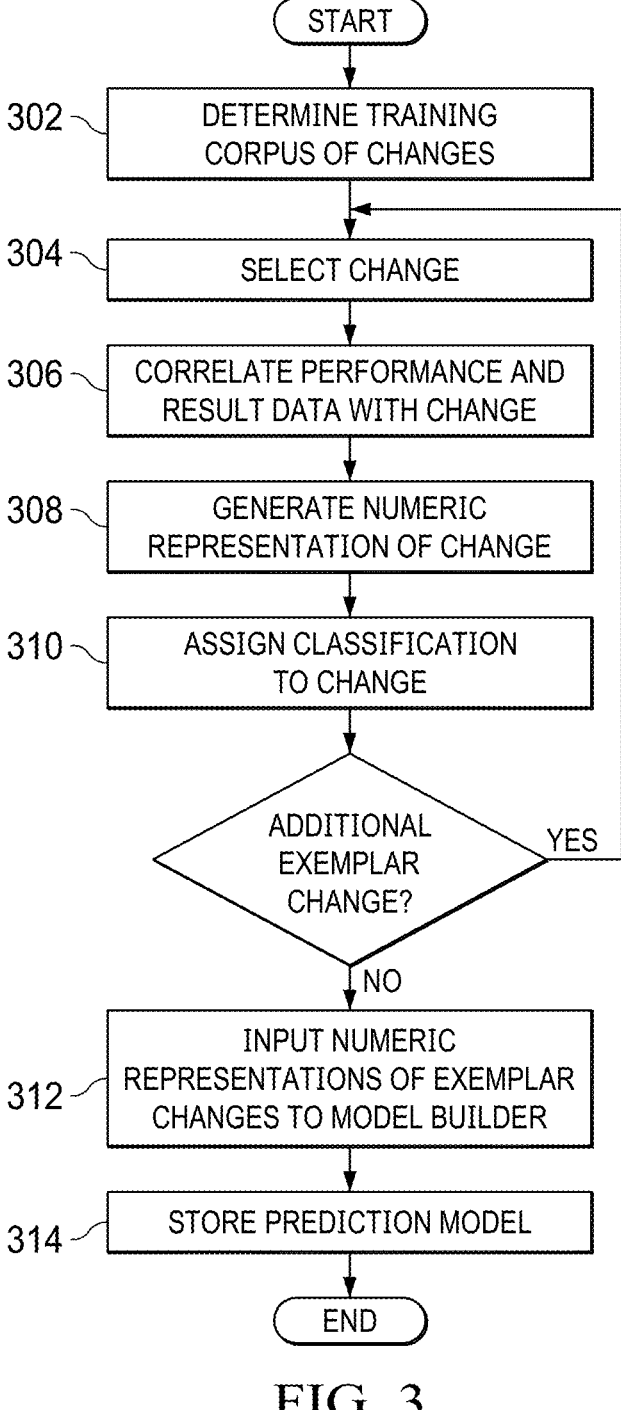
FIG. 3 is a flowchart illustrating one embodiment of a method of training a database change impact model.

Turning to FIG. 3, a flowchart of one embodiment of a method for training a prediction model is provided. In some embodiments, the method may be embodied as a set of computer executable instructions stored on a non-transitory computer readable medium. For example, the method may be performed by DBAI component 120 using one embodiment of a database change impact model.

At step 302, DBAI component 120 connects to data sources 110 and determines a training corpus of changes. According to one embodiment, the training corpus comprises changes associated with historic deployments/attempts to deployments. In accordance with one embodiment, DBAI component 120 implements directed learning in which the selection of changes to consider is provided to DBAI component 120 (e.g., as user-selected changes). In another embodiment, DBAI component 120 engages in self-directed learning.

At step 304, DBAI component 120 can select a change from the training corpus. At step 306, DBAI correlates performance and result data with the change. Using a deployment date/time associated with the change (for example the date/time at which the change or a particular set of changes of which the change is a member was deployed or attempted to be deployed to a database) DBAI can identify pre-change records and post-change records.

For a given database change, a set of pre-change performance data (for example, pre-change database server performance data, pre-change computer performance data, pre-change application performance data) and a set of post-change performance data (for example, post-change database server performance data, post-change computer performance data, post-change application performance data) can be correlated with the change. Moreover, using change histories and results, change result data can be correlated with the database change. Pre-change and post-change information about the database being managed (such as the type of database server, the number of databases being managed by the database server, the size of each database or other information) can also be correlated to a change. In correlating performance and result data with a change, DBAI can apply a variety of preprocessing on data associated with a change. For example, performance measures may be averaged, minimums and maximums determined, changes between pre-change and post-change data determined in one or more dimensions, data binned, or other preprocessing performed.

At step 308, DBAI component 120 generates a numeric representation of the change. According to one embodiment, DBAI component 120 maps the change into a matrix, feature vector or other numeric representation. As discussed above, this may include mapping the change type, change fields, correlated result data, correlated performance data to the numeric representation of the change. Some examples of numeric representations are discussed above in conjunction with FIG. 2.

At step 310, a classification can be assigned to the change. In general, the assigned classification will represent a label from the label space of the model being trained. For example, a model may be trained to classify changes or sets of changes as performant or non-performant. As such, changes in the training corpus may be assigned one of the labels. In some embodiments, a label may be based on multiple dimensions of data. For example, a change may be classified as performant or non-performant based on the change in ratio of database connections to CPU utilization. In some cases, the assignment of labels to changes may be automated through rules. In other embodiments, the labels may be assigned to changes in the training corpus by a user.

It will also be appreciated that the assigned label for a change in the training corpus may be inherent to the correlated data associated with the change. For example, the correlated data for a change may include an indication of whether the pre-change to post-change change in CPU utilization was less than a 5% increase in CPU utilization, a 5-10% increase in CPU utilization, greater than 10% increase in CPU utilization. In this example, the appropriate label for the change is already represented in the correlated data for training a model to predict changes that will result in less than a 5% increase in CPU utilization, a 5-10% increase in CPU utilization, and greater than 10% increase in CPU utilization. Thus, in some embodiments, labeling step 310 may be part of correlating step 306.

Steps 304-310 can be repeated for each change in the training corpus. In some embodiments, the same pre-change performance data can be correlated with each change in a set of changes that was deployed (or attempted to be deployed) in the same deployment. The training corpus, however, may include changes from any number of historic deployments (including, in some cases, failed deployment attempts).

At step 312, DBAI component 120 inputs the numeric representations representing the exemplar changes into AI/ML component 130 to generate a prediction model (e.g., an embodiment of a database change impact model 140) from the numeric representations and assigned classifications. DBAI component 120, at step 314, deploys the prediction model. In some embodiments, this may include storing the prediction model in a location accessible by database change deployment system 122 or otherwise making the prediction model accessible to database change deployment system 122 or other system that will use the prediction model. In such an embodiment, the prediction model may be considered a set of rules.

As discussed, the numeric representations of multiple changes can be combined into a single matrix, feature vector, or other numeric representation. To provide an example, all the changes in a changeset may be combined into a single numerical representation, such as a single matrix (possibly with submatrices) or feature vector. In such an embodiment, a numerical representation may be generated for each changeset represented by the training corpus. In some cases, the same correlated pre-change and post-change data may apply to all the changes in the changeset. Moreover, a changeset as a whole may be labeled (e.g., at labeling step 310 or through correlation). Thus, the prediction model may be trained to classify changesets (or other sets of changes) using numeric representations of the sets.

FIG. 3 is provided by way of example and not limitation. Various steps may be repeated, steps may be performed in different orders, steps omitted, and additional or alternative steps performed. Moreover, the models described are for the sake of example. Embodiments may be used to generate models trained to predict whether changes or sets of changes will result in any number of performance impacts.

Figure 4:
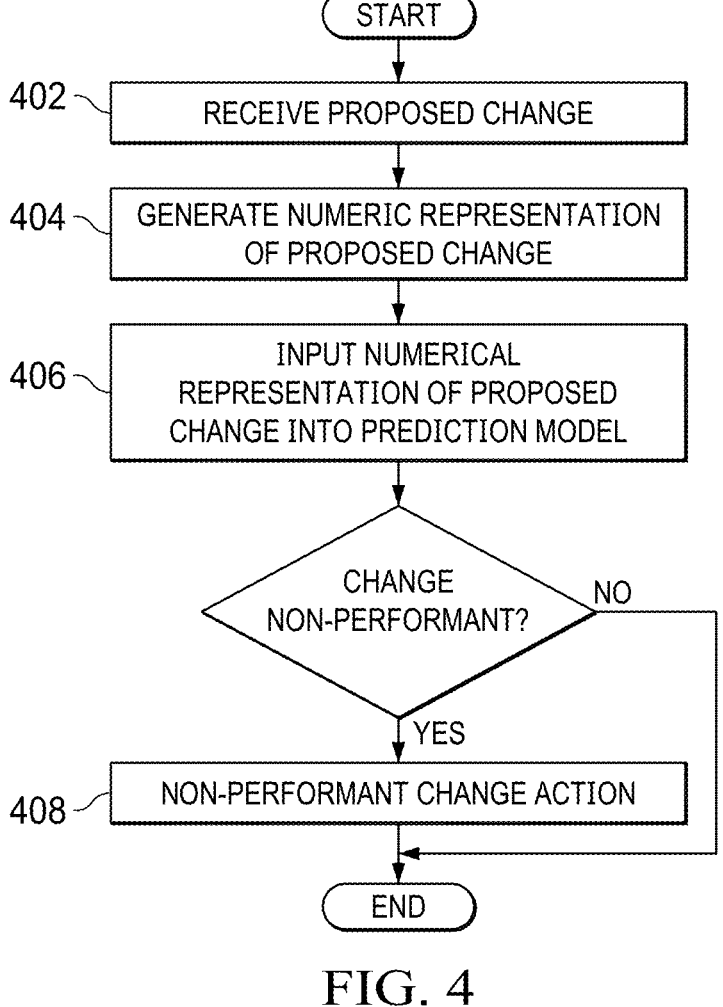
FIG. 4 is a flowchart illustrating one embodiment of a method of using a database change impact model.

FIG. 4 illustrates one embodiment for applying a prediction model. In some embodiments, the method may be embodied as a set of computer executable instructions stored on a non-transitory computer readable medium. For example, the method may be performed by database change deployment system 122 using one embodiment of a database change impact model.

At step 402, a new change is received for evaluation. At step 404, database change deployment system 122 generates a numeric representation of the change. According to one embodiment, for example, database change deployment system 122 maps the change type to a matrix representation of the change. Depending on implementation, database change deployment system 122 may also map the change fields to the numeric representation of the change. At step 406, database change deployment system 122 inputs the numeric representation of the change into a database change impact model 140 trained to classify changes. As will be appreciated, database change impact model 140 may output a confidence that the change belongs to one or more classes in a label space. For example, database change impact model 140 may be trained to classify changes as performant or non-performant and can thus output a confidence that the change is performant and/or a confidence that the change is non-performant. As another example, database change impact model 140 may be trained to predict changes resulting in less than a 5% increase in CPU utilization, a 5%-10% increase in CPU utilization, and resulting in greater than a 10% increase in CPU utilization.

Based on the output of database change impact model 140, the change can be predicted to be performant or non-performant. In one embodiment, a confidence output by the model for a class can be compared to a threshold. For example, the confidence that the change is non-performant can be compared to a threshold and, if the threshold is met, the change can be predicted to be non-performant. As a more particular example, the confidence that a change will result in greater than a 10% increase in CPU utilization may be compared to a threshold to determine if the change should be considered to be non-conformant.

In any case, if the change is predicted to be non-performant, database change deployment system 122 may implement specified remedial actions (step 408). For example, database change deployment system 122 may provide a notification that the change is non-performant and, in some implementation, why the change is considered to be non-conformant. In another embodiment, database change deployment system 122 may stop or block the change. In yet another embodiment, database change deployment system 122 may implement database change impact model 140 as part of a forecast simulation and provide an indication that the change is predicted to be non-performant when database change deployment system 122 generates a forecast for a set of changes. For example, the forecast report may include an indication that change is predicted to result in greater than a 10% increase in CPU utilization.

It can be noted that, in some embodiments, a set of changes, such as represented by a changeset, may be evaluated as a whole. For example, at step 402, a new changeset is received for evaluation. At step 404, database change deployment system 122 generates a numeric representation of the changeset. According to one embodiment, for example, database change deployment system 122 maps the change types of change in the changeset to a matrix representation of the changeset. Depending on implementation, database change deployment system 122 may also map the change fields to the numeric representations of the changeset. At step 406, database change deployment system 122 inputs the numeric representation of the changeset into a database change impact model 140 trained to classify changesets. As will be appreciated, database change impact model 140 may output a confidence that the changeset belongs to one or more classes in a label space. For example, database change impact model 140 may be trained to classify changesets as performant or non-performant and can thus output a confidence that the changeset is performant and/or a confidence that the changeset is non-performant.

Based on the output of database change impact model 140, the changeset can be predicted to be performant or non-performant. In one embodiment, a confidence output by the model for a class can be compared to a threshold. For example, the confidence that the changeset is non-performant can be compared to a threshold and, if the threshold is met, the changeset can be predicted to be non-performant. In any case, if the changeset is predicted to be non-performant, database change deployment system 122 may implement specified remedial actions (step 408). For example, database change deployment system 122 may provide a notification that the changeset is predicted to be non-performant. In another embodiment, database change deployment system 122 may stop or block the changeset. In yet another embodiment, database change deployment system 122 may implement database change impact model 140 as part of a forecast simulation and provide an indication that the changeset is predicted to be non-performant when database change deployment system 122 generates a forecast for a set of changes that includes the changeset.

FIG. 4 is provided by way of example and not limitation. Various steps may be repeated, steps may be performed in different orders, steps omitted, and additional or alternative steps performed. Moreover, the models described are provided for the sake of example. Embodiments utilize models trained to predict whether changes or sets of changes will result in any number of performance impacts.

FIG. 3 and FIG. 4 are discussed in terms of training a model that acts as a classifier. In other embodiments, a regression model may be trained to predict performance impact. For example, the numerical representations of changes or sets of changes may be used to develop a linear regression model to output a predicted value for a performance metric as the predicted performance impact. For example, a model may be developed to output a predicted change in CPU utilization, a predicted resulting CPU utilization, a predicted change in memory utilization, a predicted resulting memory utilization, a predicted change in the ratio of database connections to CPU utilization, a predicted resulting ratio of database connections to CPU utilization, or predicted value for another performance metric of interest, for a given change or set of changes. Rules may be applied to the output of the regression model to determine if a change or set of changes is to be considered non-performant.

Returning to FIG. 1, as another example, AI/ML component 130 applies machine learning to identify changes/ change patterns that meet particular criteria. More particularly, AI/ML component 130 can be configured to identify changes and change patterns that result in positive or negative changes. In one embodiment, AI/ML component 130 can apply machine learning to identify a list of changes that meet particular performance criteria and to identify, from that list, a change pattern (e.g., a change type, possibly in combination with one or more change field values) that has a strong probability of meeting the performance criteria (e.g., 90% probability, always meets the criteria, or meets some other threshold). Given the identified pattern (e.g., identified change type, possibly in combination with one or more change field values) from AI/ML component 130, rules generator 132 creates rules 142 to never allow certain changes, rules to always require certain changes or other rules.

As one example, the ENUM data type presents performance issues in some situations, but not others. A model can be trained to determine which patterns involving the ENUM data type lead to performance degradations to generate rules governing when a change to the ENUM data type is allowable for a particular database schema and database configuration and when changes involving the ENUM data type should be rejected.

Figure 5:
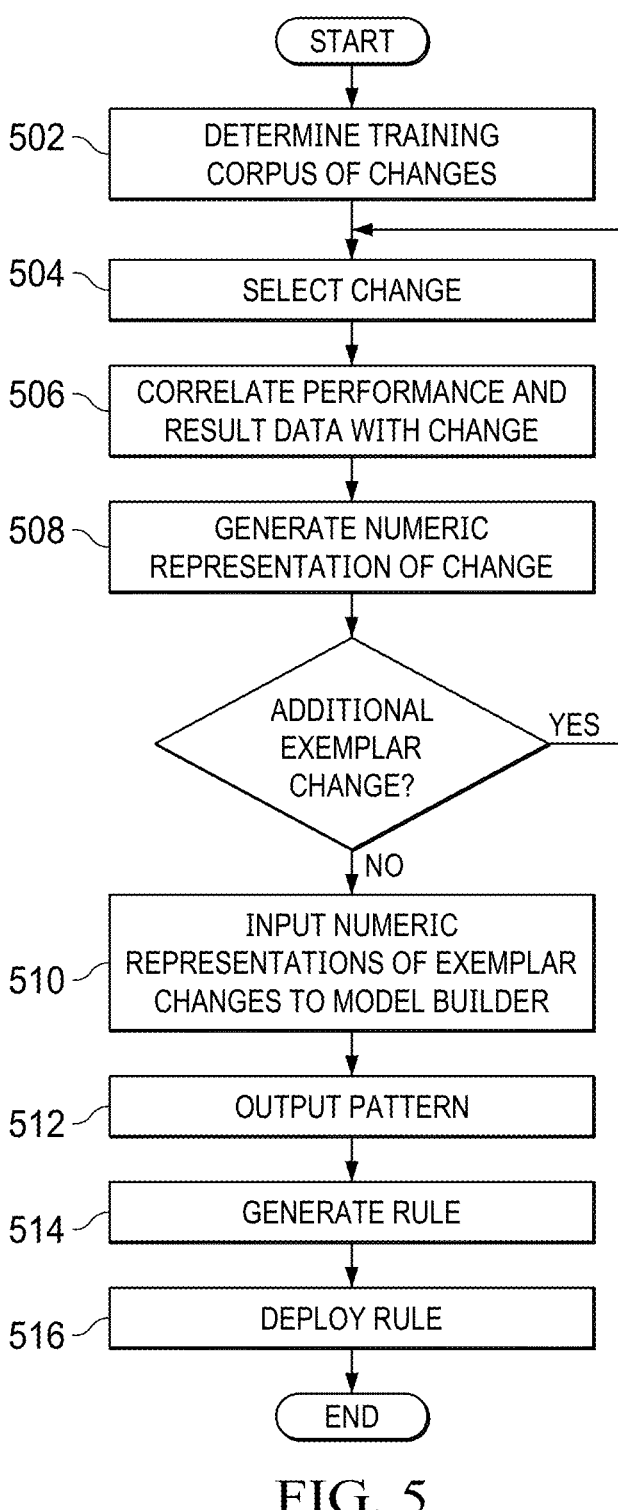
FIG. 5 is a flow chart illustrating one embodiment of a method for generating rules.

Turning to FIG. 5, a flowchart of one embodiment of a method for training a prediction model is provided. In some embodiments, the method may be embodied as a set of computer executable instructions stored on a non-transitory computer readable medium. For example, the method may be performed by DBAI component 120 using one embodiment of a database change impact model.

Steps 502, 504, 506, 508 may be similar to steps 302, 304, 306, 308. Steps 504-508 can be repeated for each change in the training corpus. In some embodiments, the same pre-change performance data can be correlated with each change in a set of changes that was deployed (or attempted to be deployed) in the same deployment. The training corpus, however, may include changes from any number of historic deployments (including, in some cases, failed deployment attempts).

At step 510, DBAI component 120 inputs the numeric representations representing the exemplar changes into AI/ML component 130 to generate a prediction model (e.g., a database change impact model 140) from the numeric representations. The model may be configured to identify patterns that lead to various performance impacts. For example, AI/ML component 130 may implement unsupervised learning to generate a model to determine patterns in changes that have a strong correlation with a greater than 10% increase in CPU utilization, patterns that have a strong correlation with an increase (or decrease) in the ratio of connections to CPU utilization, or patterns that have a strong correlation with another performance impact of interest.

At step 512, database change impact model 140 may output a change pattern having a strong correlation with a performance impact. The pattern can be used to generate a rule (step 514). According to one embodiment, DBAI component 120, applies a code template to generate a rule from the pattern. For example, the code template may be used to create conditional statements where, if each change type and field value identified in the pattern are true, a change should fail.

As an example, AI/ML component 130 can be configured to apply machine learning to identify changes that lead to more than a 10% reduction in performance according to one or performance metrics and to identify, from those changes, a change pattern, if any, that has a threshold probability of causing a 10% reduction in performance. AI/ML component 130 may, for example, identify that the ChangeDatatype to change from integer to string is highly correlated with the performance criteria of a 10% reduction in performance. As such, this pattern can be output to rules generator 132 and rules generator 132 can generate a rule to block proposed changes meeting this pattern. By way of example, but not limitation, rules generator 132 can generate a rule 142 as represented by the below pseudocode:

```
when
    cs.changeDatatype (String)
    where cs.currentDatatype (Int)
then
    fail
```

The rule 142 can be propagated to database change deployment system 122 for enforcement in future deployments (step 516). In some embodiments, change deployment system 122 offers a user the option to change or reject a rule 142 prior to the rule being enforced by change deployment system 122.

In some embodiments, the numeric representations of multiple changes can be combined into a single matrix, feature vector, or other numeric representation. To provide an example, all the changes in a changeset may be combined into a single numerical representation, such as a single matrix (possibly with submatrices) or feature vector. In such an embodiment, a numerical representation may be generated for each changeset represented by the training corpus. In some cases, the same correlated pre-change and post-change data may apply to all the changes in the changeset. Moreover, a changeset as a whole may be labeled (e.g., at labeling step 310 or through correlation). Thus, a model may be trained to identify patterns in changesets (or other sets of changes) as a whole using numeric representations of the sets. Accordingly, a change pattern that leads to a particular performance impact may be identified, where the change pattern includes multiple change types, even if the individual change types are not individually strongly correlated with the performance impact.

FIG. 5 is provided by way of example and not limitation. Various steps may be repeated, steps may be performed in different orders, steps omitted, and additional or alternative steps performed. Moreover, the models described are provided for the sake of example. Embodiments may be used to generate models trained to identify change patterns that will result in any number of performance impacts.

It can be noted that while embodiments described herein are discussed in terms of using a rich set of correlated performance and results data, embodiments may also provide benefits even if only a more limited set of correlated data is used. For example, in one embodiment, correlated change data 129 may include, for each change, an indication of whether or not a post-change rollback occurred (or other indication that the change was non-performant). By analyzing such data, a pattern highly correlated with rollback, if any, can be detected. For example, AI/ML component 130 may identify that a particular change type leads to rollback. As such, rules can be implemented to block or recommend against the inclusion of changes of that change type.

Figure 6:
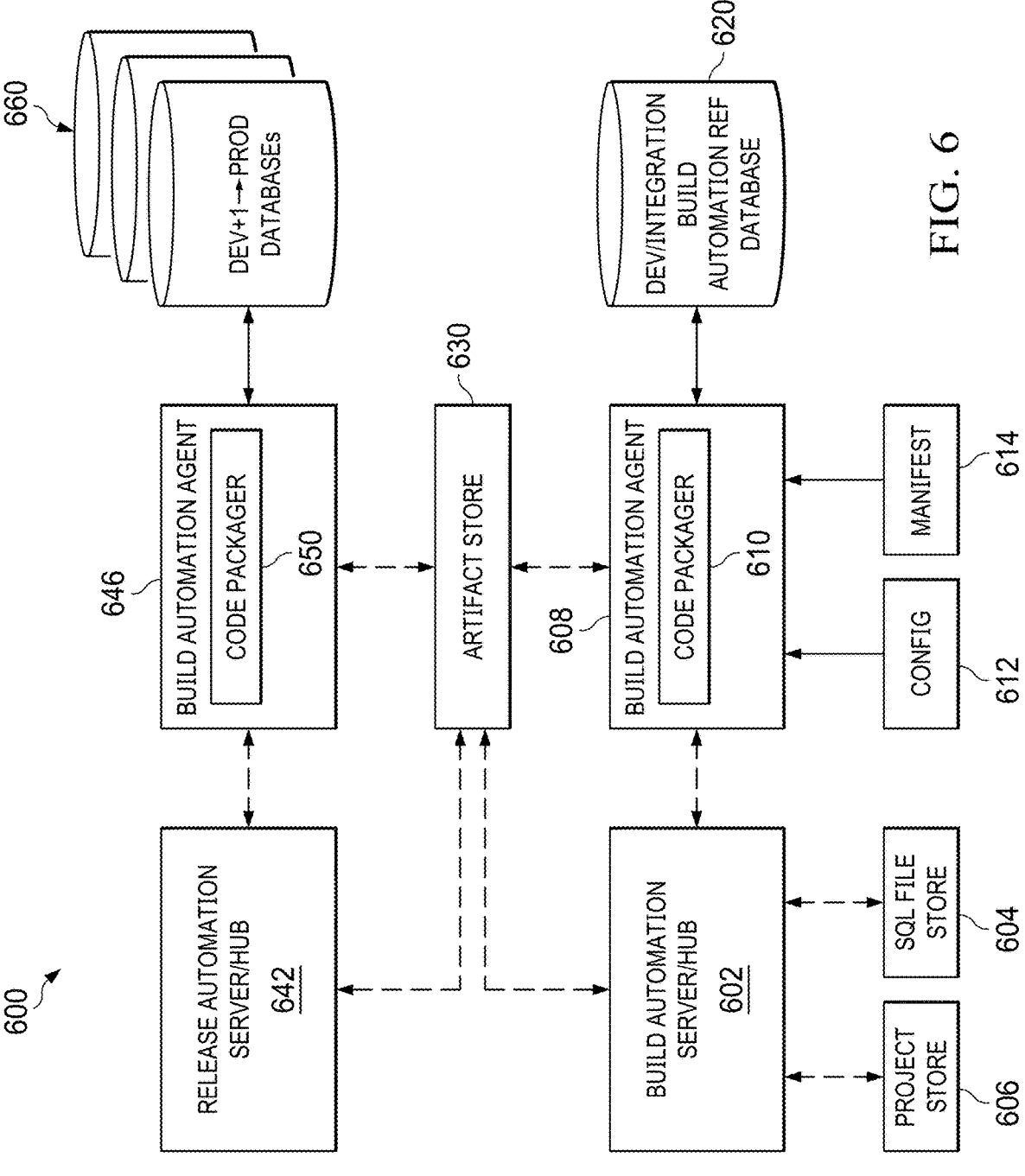
FIG. 6 is a diagrammatic representation of one embodiment of an architecture for packaging and deploying database changes.

FIG. 6 is a diagrammatic representation of one embodiment of an architecture 600 for packaging and deploying database changes. In the embodiment illustrated, architecture 600 includes a development tier and a production tier, though additional tiers may be included.

The development tier includes a build automation server/hub 602, which may comprise a source code manager (SCM). Build automation server/hub 602 may be coupled to or manage an SQL store 604 that stores SQL scripts and a project store 606 which stores projects (in this context a project can refer to an application (i.e., application code and related files). The development tier also includes a build automation agent 608. Build automation agent 608, according to one embodiment, comprises a database change management code with a code packager 610. The code packager 610 includes a SQL parser and associated SQL readers. According to one embodiment, database change deployment system 122 of FIG. 1 may build automation agent 608.

In general, code packager 610 is provided with a deployment configuration that specifies options to use during packaging. Configuration 612 can specify, for example, information about source code management repositories where SQL scripts and projects reside (e.g., information about SQL store 604 and project store 606). In another embodiment, the configuration for code packager 610 may be provided as a manifest 614, which identifies the SQL scripts to be processed and provides metadata about the scripts.

During processing, the code packager 610 retrieves the appropriate SQL scripts from the SCM of the build automation server/hub 602 and implements a workflow to deploy changes to a reference to a database 620. If database 620 can be updated without error, code packager 610 creates an artifact embodying the changes to the database and stores the artifact in an artifact store 630. A release/automation server/hub 642 calls a build automation agent 646, which comprises a code packager 650, to pick up the artifact and process the changes in the artifact to update a database 660 (e.g., a production database or other database).

Figure 7:
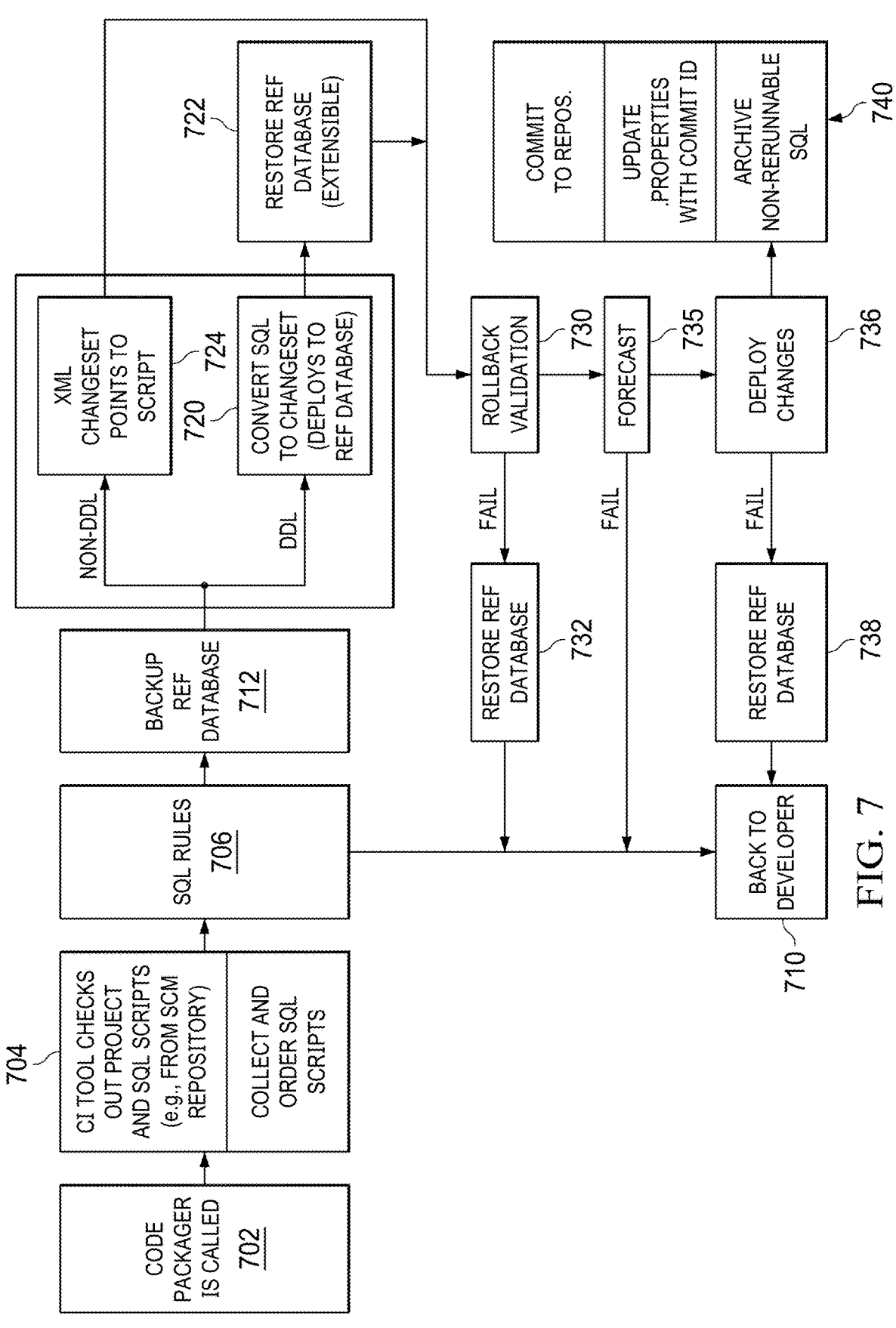
FIG. 7 is a diagrammatic representation of one embodiment of a workflow implemented by a code packager.

One embodiment of a workflow implemented by a packager (e.g., code packager 610) is illustrated in FIG. 7. At step 702 the code packager is called to perform a packaging job. At 704, the code packager retrieves the project and SQL scripts (e.g., from an SCM repository) specified in a configuration for the packaging job. For example, the code packager can check out a project from the project store 606 (e.g., a project) and scripts from SQL store 604 (e.g., an SQL SCM). The code packager determines the list of scripts to package. For example, this can be determined by what changes have been introduced to the SQL SCM since the last successful packaging job for the project (If this is the first packaging job then all scripts will be packaged).

At step 706, the code packager checks the SQL scripts to be packaged for rules compliance. If the scripts fail to pass the rules applied at step 706, the scripts are returned to the developer (step 710). In some embodiments, a database change impact model 140 or rules 142 may be deployed to the code packager for use at step 706. For example, the packager may process a proposed change using a database change impact model 140 to determine a predicted impact and implement rules based on the predicted impact. As another example, the packager may execute one or more rules 142 generated by DBAI component 120. The code packager may also apply rules as described in U.S. patent application Ser. No. 16/953,411, entitled "Code Packager With SQL Parser," filed Dec. 15, 2020 (the "'411 application"), which is hereby fully incorporated by reference herein.

For example, the packaging job fails, and a notification is provided to the developer. At step 712, the packager back ups the reference database against which it will execute the changes. For example, referring to FIG. 6, packager 610 backs up REF database 620.

If the SQL scripts pass the SQL rules applied at step 706, the SQL scripts can be packaged as changes according to a convert method (step 720) or a packager native method (step 724), based, for example, on the configuration for the project, the placement of the script in a particular location or other factors. For scripts that use a convert method, the scripts are converted to changesets (step 720). According to one embodiment, this may comprise: taking a first snapshot ("snapshot1") of the existing schema of the reference database (e.g., the schema of REF database 620), applying the scripts to the reference database, taking a second snapshot to the database schema ("snapshot2"), comparing snapshot1 and snapshot2, and generating a changelog (e.g., an XML changelog) based on the results of the comparison. The changelog is stored as a changelog file. The changelog can be used to instantiate objects according to a change object model (e.g., a DatabaseChangeLog object and ChangeSet objects) during forecasting. At step 722, the packager restores the reference database (e.g., using the backup created at 712).

According to a packager native process, an XML changelog (or other changelog) is generated in which each changeset points to a corresponding SQL script (e.g., of the scripts collected and ordered at step 704) (step 724). At the forecasting step, the SQL scripts are parsed to generate the change objects (e.g., changeset objects) used in forecasting.

If the SQL scripts include rollbacks, the packager runs the SQL scripts against the reference database and executes the rollbacks (step 730). If rollback does not occur properly, the packager restores the reference database from the backup (step 732), and the scripts are returned to the developer (step 710). For example, if the packaging job fails, a notification is provided to the developer. If rollback is successful, the packager proceeds to forecasting (step 735).

At step 735, the packager implements forecasting. According to one embodiment, the packager may implement forecasting through simulating changes and applying rules via rules engine. One embodiment of a database change management simulator/rules engine is described in U.S. Pat. No. 10,268,709, entitled "System, Method and Computer Program Product for Database Change Management," issued Apr. 23, 2019 (the "'709 Patent"), which is hereby fully incorporated herein by reference for all purposes.

According to various embodiments, a packager simulates changes to a database using an in-memory model of the database (e.g., an in-memory model of the database schema). Database changes embodied in SQL are applied to the model to simulate changes. Example embodiments of using a simulation model to simulate changes and forecast the results of changes is described in the '709 Patent.

The packager is provided with or collects a snapshot and profile data of the target database (e.g., REF database 620). For example, the packager can query the current state of a managed database schema, if not already known, and output a representation of the schema. As would be understood by those of ordinary skill in the art, a database server can provide a listing of database schema objects in response to one or more queries. Thus, by querying a database, the packager can determine, for example, the tables, columns, constraints, and other schema objects to produce a snapshot of a database. The schema objects provided in the snapshot can be mapped to a model of the schema.

The snapshot can be augmented with any other data that might impact the application of changes. According to one embodiment, for example, the packager may connect to a managed database, read information from the schema as well as summary information about data stored, and record profile information or other data. Examples of information that may be provided include, but are not limited to, row counts of data tables, database engine parameters such as buffer sizes, memory allocation, file system implementations, table types, permission models (which users have permission to change which structures). The packager may also test database performance by recording the time it takes to perform database operations. The packager can thus collect a schema snapshot and light-weight data profile (e.g., row counts and permission model) of a database useful for forecasting the performance of database changes. As described in the '709 Patent, such information can be used to build a baseline simulation model of the target database.

The packager creates a change object model from a changelog generated from the convert process (step 720) or parses the SQL scripts referenced by the changesets generated in the packager native process (step 724) to generate the objects. The changes in the change objects are applied to an in-memory model of the database (e.g., a simulation model) to simulate the changes to the database. The packager can apply rules configured to ensure that proposed database code changes are safe and in compliance with an organization's database standards. Forecasting can enable application developers with a self-service validation capability that uses the same automated build process established for the application. Instant feedback can be delivered to developers on changes that violate rules, while database changes that pass the rules can be propagated to the target environment.

According to one embodiment, the packager ends the job if unrecoverable errors (or other predefined errors) are identified when simulating the changes. Otherwise, the packager can notify the developer of recoverable errors. The packager also determines the impact of changes to the database. For example, the packager can use row counts or other information to predict long-running operations and operations which destroy or alter large amounts of data. The row counts coupled with database engine parameters, table types and database performance metrics allow the packager to predict the time it takes to perform the proposed changes represented by a changelog. The row counts combined with the changes, in some cases, can be sufficient to warn the user about the amount of data altered or destroyed. A forecast report can be produced that contains information about the success of proposed changes, the impact of the proposed changes and other information.

Forecasting may include running pre-forecast rules, forecast rules and post-forecast rules. through pre-forecast, forecast, and post-forecast rules, the packager can determine if a change violates rules including permission rules (e.g., as determined by a permission model from profile information), rules that model those applied by the underlying database, or rules to ensure that the changes do not violate an organization's database rules. The packager can log warnings or errors associated with the changes that caused them and the context of the error including the state of the model at the time.

In some embodiments, a database change impact model 140 or rules 142 may be deployed to the code packager for use at step 735. For example, the packager may process a proposed change using a database change impact model 140 to determine a predicted impact and implement rules based on the predicted impact. As another example, the packager may execute one or more rules 142 generated by DBAI component 120. The code packager may also apply rules as described in the '411 application.

If there are no errors in the forecast that would prevent deployment, the packager deploys the changes to the reference database (step 736). If deployment fails, the packager restores the reference database from the backup (step 738) and the scripts are returned to the developer (step 710). For example, upon a failed deployment, the packaging job ends, and a notification is sent to the developer. At step 740, the packager moves non-rerunnable SQL Files to the archive and commits changes to SCM repositories.

Returning briefly to FIG. 6, if deployment of changes to database 620 is successful, the project with associated database changes can be stored in the artifact store 630 for deployment to the next tier. In the example of FIG. 6, the changes can be processed to update databases 660.

Build automation agent 608 and build automation agent 646 may maintain audit databases that record a detailed report of the changes deployed (e.g., by reference to a changelog and/or individual change); runtime data (e.g., deployment operation duration, person or automation agent and system from which the operation was initiated); results of any rules validation; salient messages from the database during the update or other data. In some embodiments, the audit database also records indications of human initiated actions, such as rollback or abandonment, that may indicate a non-performant change. Information from the audit databases may be used by a DBAI component.

Figure 8:
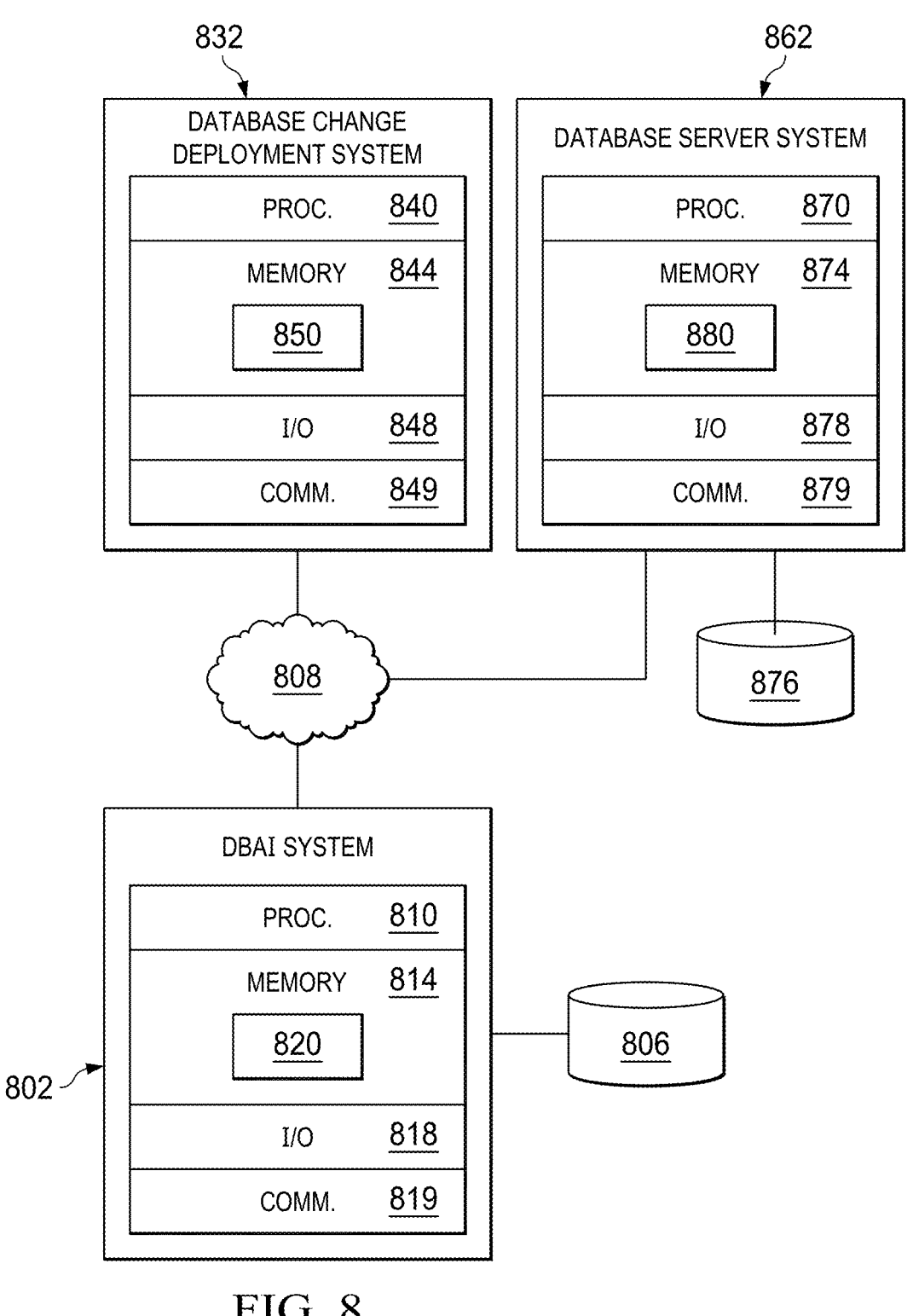
FIG. 8 is a diagrammatic representation of one embodiment of a network environment.

FIG. 8 is a diagrammatic representation of one embodiment of a distributed network environment. The environment may comprise one or more computer systems with central processing units executing instructions embodied on one or more computer-readable media where the instructions are configured to perform at least some of the functionality associated with embodiments of the present invention. In the illustrated embodiment, the environment includes a computer system 802 having a computer processor 810 and associated memory 814. Computer processor 810 may be an integrated circuit for processing instructions. For example, computer processor 810 may comprise one or more cores or micro-cores of a processor. Memory 814 may include volatile memory, non-volatile memory, semi-volatile memory or a combination thereof. Memory 814, for example, may include RAM, ROM, flash memory, a hard disk drive, a solid-state drive, an optical storage medium (e.g., CD-ROM), or other computer-readable memory or combination thereof. Memory 814 may implement a storage hierarchy that includes cache memory, primary memory or secondary memory. In some embodiments, memory 814 may include storage space on a data storage array. Computer system 802 may also include input/output ("I/O") devices 818, such as a keyboard, monitor, printer, electronic pointing device (e.g., mouse, trackball, stylus, etc.), or the like. Computer system 802 may also include a communication interface 819, such as a network interface card, to interface with network 808, which may be a local LAN, a WAN such as the Internet, mobile network, or other type of network or combination thereof. Network 808 may represent a combination of wired and wireless networks that may be utilized for various types of network communications.

Memory 814 may store instructions executable by computer processor 810. According to one embodiment, memory 814 may include code 820 executable to implement DBAI component 120. Data store 806, which may be part of or separate from memory 814, may comprise one or more database systems, file store systems, or other systems.

The environment of FIG. 8 also includes a computer system 832 having a computer processor 840 and associated memory 844. Computer processor 840 may be an integrated circuit for processing instructions. For example, computer processor 840 may comprise one or more cores or microcores of a processor. Memory 844 may include volatile memory, non-volatile memory, semi-volatile memory or a combination thereof. Memory 844, for example, may include RAM, ROM, flash memory, a hard disk drive, a solid-state drive, an optical storage medium (e.g., CD-ROM), or other computer-readable memory or combination thereof. Memory 844 may implement a storage hierarchy that includes cache memory, primary memory or secondary memory. In some embodiments, memory 844 may include storage space on a data storage array. Computer system 832 may also include I/O devices 848, such as a keyboard, monitor, printer, electronic pointing device (e.g., mouse, trackball, stylus, etc.), or the like. Computer system 832 may also include a communication interface 849, such as a network interface card, to interface with network 808.

Memory 844 may store instructions executable by computer processor 840. According to one embodiment, memory 844 may include code 850 executable to implement database change deployment system 122.

The environment of FIG. 8 also includes a computer system 862 having a computer processor 870 and associated memory 874. Computer processor 870 may be an integrated circuit for processing instructions. For example, computer processor 870 may comprise one or more cores or microcores of a processor. Memory 874 may include volatile memory, non-volatile memory, semi-volatile memory or a combination thereof. Memory 874, for example, may include RAM, ROM, flash memory, a hard disk drive, a solid-state drive, an optical storage medium (e.g., CD-ROM), or other computer-readable memory or combination thereof. Memory 874 may implement a storage hierarchy that includes cache memory, primary memory or secondary memory. In some embodiments, memory 874 may include storage space on a data storage array. Computer system 862 may also include I/O devices 878, such as a keyboard, monitor, printer, electronic pointing device (e.g., mouse, trackball, stylus, etc.), or the like. Computer system 862 may also include a communication interface 879, such as a network interface card, to interface with network 808. Data store 876, which may be part of or separate from memory 874, may comprise one or more database systems, file store systems, or other systems to implement, for example, managed databases.

Memory 874 may store instructions executable by computer processor 870. For example, memory 874 may include code 880 executable to provide database server 102, application 105, server performance monitoring component 106, computer performance monitoring component 108, application performance monitoring component 109.

Each of the computers in FIG. 8 may have more than one CPU, ROM, RAM, HD, I/O, or other hardware components. Portions of the methods described herein may be implemented in suitable software code that may reside within computer-readable memory. While only one of computer system 802, computer system 832 and computer system 862 are illustrated, there may be multiple of each such computer system. Moreover, a network environment may include additional or alternative computer systems. For example, an application server computer system may run application 105, a computer performance monitoring component 108, and an application monitoring component. Furthermore, various components illustrated as distributed may run on the same processor or computer. For example, a DBAI component, database server, application, and monitoring components.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more I/O device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented by execution of suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage media and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented using control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement through execution of software programming or code steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code executed by a processor, by using application specific integrated circuits, programmable logic devices, field programmable gate arrays, optical, chemical, biological, quantum or nanoengineered systems, components and mechanisms. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A database change management system comprising:
  a memory for storing a set of database changes of a plurality of database change types, a set of pre-change performance data and a set of post-change performance data;
  a processor;
a non-transitory, computer-readable medium storing computer-executable code, said computer-executable code comprising instructions for:
  correlating the set of pre-change performance data and the set of post-change performance data to the set of database changes and to generate a set of correlated performance data for the set of database changes;
  generating database change numeric representations from the set of database changes and the set of correlated performance data, each database change numeric representation comprising a matrix having positions representing a plurality of database change field values and a piece of correlated performance data;
  processing the database change numeric representations using a supervised machine learning model to identify a change pattern having a strong correlation to a database change impact corresponding to the piece of correlated performance data, the change pattern representing a learned correlation between the database change field values and a corresponding database change impact, wherein the supervised learning model is trained on historical database change data and associated performance data, the historical database change data and the associated performance data being formatted according to the database change numeric representations;
  based on the change pattern, automatically generating a rule that applies to the first database change type; and
  updating a database change deployment system with the rule, wherein the database change deployment system is configured to automatically enforce the rule to prevent deployment of a proposed change of the first database change type.

2. The database change management system of claim 1, wherein the set of correlated performance data comprises computer server performance data.

3. The database change management system of claim 1, wherein the set of correlated performance data comprises database server performance data.

4. The database change management system of claim 1, wherein the set of correlated performance data comprises a set of database change results.

5. The database change management system of claim 1, wherein the set of database changes include a plurality of change field values and wherein the database change numeric representations represent the plurality of change field values and wherein the change pattern represents a first change field value from the plurality of change field values.

6. The database change management system of claim 1, wherein the rule is executable to prevent a new change of the first database change type from being deployed.

7. A computer program product comprising a non-transitory, computer-readable medium storing computer-executable code, said computer-executable code comprising instructions for:
  receiving a set of database changes of a plurality of database change types, a set of pre-change performance data, and a set of post-change performance data;
  correlating the set of pre-change performance data and the set of post-change performance data to the set of database changes and to generate a set of correlated performance data for the set of database changes;
  generating database change numeric representations from the set of database changes and the set of correlated performance data, each database change numeric representation comprising a matrix having positions representing a plurality of database change field values and a piece of correlated performance data;
  processing the database change numeric representations using a supervised machine learning model to identify a change pattern having a strong correlation to a database change impact corresponding to the piece of correlated performance data, the change pattern representing a learned correlation between the database change field values and a corresponding database change impact, wherein the supervised learning model is trained on historical database change data and associated performance data, the historical database change data and the associated performance data being formatted according to the database change numeric representations;
  based on the change pattern, automatically generating a rule that applies to the first database change type; and
  updating a database change deployment system with the rule, wherein the database change deployment system is configured to automatically enforce the rule to prevent deployment of a proposed change of the first database change type.

8. The computer program product of claim 7, wherein the set of correlated performance data comprises computer server performance data.

9. The computer program product of claim 7, wherein the set of correlated performance data comprises database server performance data.

10. The computer program product of claim 7, wherein the set of correlated performance data comprises a set of database change results.

11. The computer program product of claim 7, wherein the set of database changes include a plurality of change field values and wherein the database change numeric representations represent the plurality of change field values and wherein the change pattern represents a first change field value from the plurality of change field values.

12. The computer program product of claim 7, wherein the rule is executable to prevent a new change of the first database change type from being deployed.

13. A database change management method comprising:
  receiving a set of database changes of a plurality of database change types, a set of pre-change performance data, and a set of post-change performance data;
  correlating the set of pre-change performance data and the set of post-change performance data to the set of database changes and to generate a set of correlated performance data for the set of database changes;

generating database change numeric representations from the set of database changes and the set of correlated performance data, each database change numeric representation comprising a matrix having positions representing a plurality of database change field values and a piece of correlated performance data;

processing the database change numeric representations using a supervised machine learning model to identify a change pattern having a strong correlation to a database change impact corresponding to the piece of correlated performance data, the change pattern representing a learned correlation between the database change field values and a corresponding database change impact, wherein the supervised learning model is trained on historical database change data and associated performance data, the historical database change data and the associated performance data being formatted according to the database change numeric representations;

based on the change pattern, automatically generating a rule that applies to the first database change type; and updating a database change deployment system with the rule, wherein the database change deployment system is configured to automatically enforce the rule to prevent deployment of a proposed change of the first database change type.

14. The database change management method of claim 13, wherein the set of correlated performance data comprises computer server performance data.

15. The database change management method of claim 13, wherein the set of correlated performance data comprises database server performance data.

16. The database change management method of claim 13, wherein the set of correlated performance data comprises a set of database change results.

17. The database change management method of claim 13, wherein each database change numeric representation comprises a matrix having positions representing each of the plurality of database change types.

* * * * *